United States Patent [19]

Miller

[11] 4,259,882
[45] Apr. 7, 1981

[54] ELECTRONIC SHIFT CONTROL

[75] Inventor: Alan L. Miller, Mount Prospect, Ill.

[73] Assignee: Borg-Warner Corporation, Chicago, Ill.

[21] Appl. No.: 866,431

[22] Filed: Jan. 3, 1978

[51] Int. Cl.³ .................................................. B60K 41/02
[52] U.S. Cl. ........................................... 74/862; 74/866
[58] Field of Search ............... 74/866, 752 D, 752 A, 74/862, 864

[56] References Cited

U.S. PATENT DOCUMENTS

| 3,719,096 | 3/1973 | Sprague | 74/752 D |
|---|---|---|---|
| 3,726,159 | 4/1973 | Mizote | 74/866 |
| 3,750,495 | 8/1973 | Ito et al. | 74/866 |
| 3,876,028 | 4/1975 | Asano et al. | 74/866 X |
| 3,956,947 | 5/1976 | Leising | 74/752 A X |
| 4,008,567 | 2/1977 | Hirsch | 74/866 X |
| 4,031,782 | 6/1977 | Miller et al. | 74/866 |
| 4,044,634 | 8/1977 | Florous et al. | 74/866 |
| 4,102,222 | 7/1978 | Miller et al. | 74/866 |
| 4,106,368 | 8/1978 | Ivey | 74/866 |

Primary Examiner—Rodney H. Bonck
Attorney, Agent, or Firm—James J. Jennings

[57] ABSTRACT

A control system for a power shifted transmission with a hydraulic actuated friction clutch incorporating hydraulic valves controlled by an electronic system responsive to a torque signal from an input or output shaft in the transmission, and including a torque level controlled by a computer stage in the electronic control.

15 Claims, 5 Drawing Figures

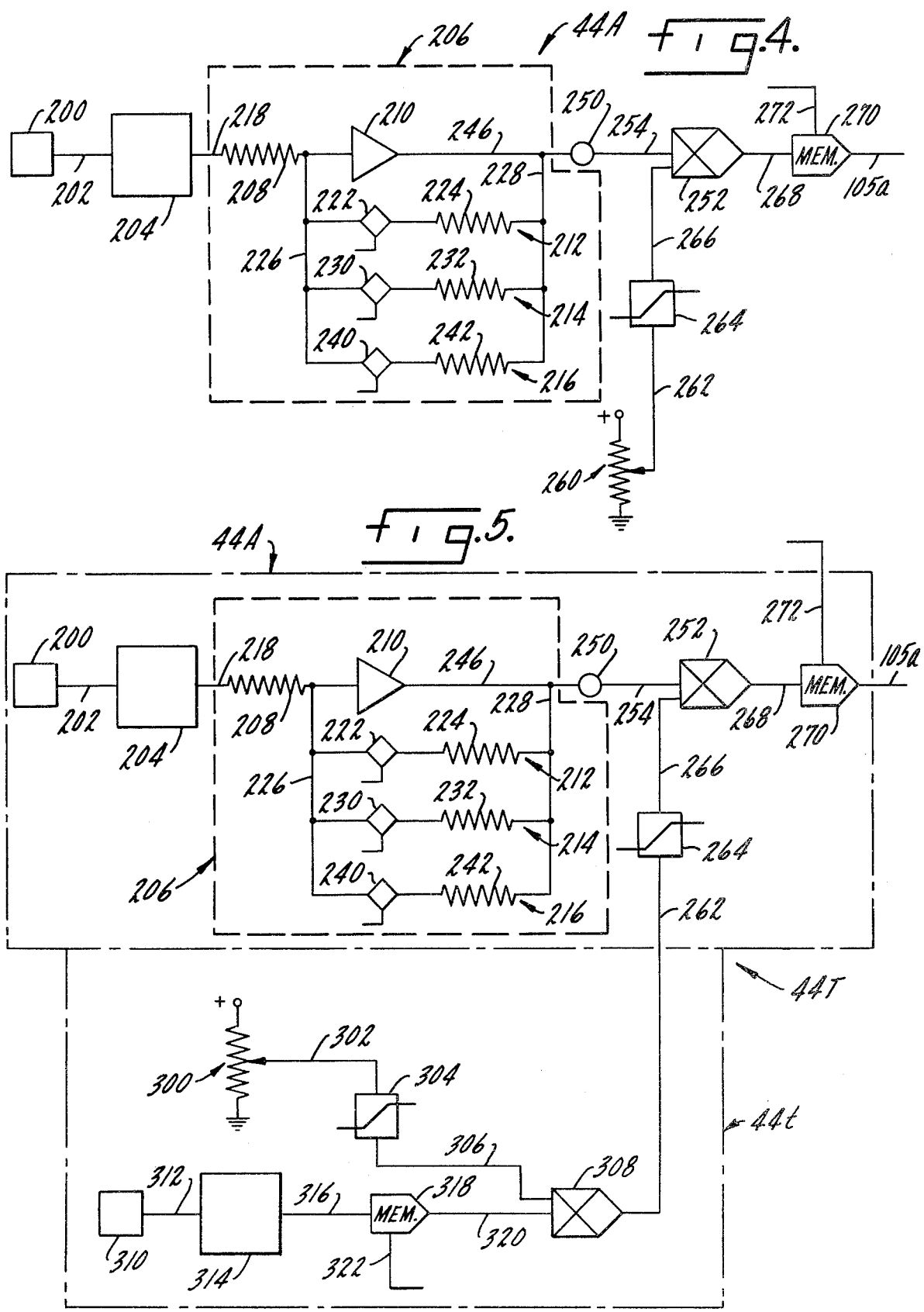

ELECTRONIC SHIFT CONTROL

BACKGROUND OF THE INVENTION

1. This invention relates to the general field of power shifted transmissions and electronic controls therefor.

2. Prior Art

It has been known in the prior art to use hydraulic control valves for the control of power shifted transmissions, and further to use various orifices and shuttling valves to control pressure buildup in the friction elements for the transmission to provide for gradual or rapid pressure buildup depending upon conditions and as indicated by movement of a control valve. Further it has been known to provide for electrically operated control valves such as solenoid valves with off/on positions which will operate to supply fluid pressure to the power shifted clutches and to use various accumulator devices to cushion the engagement of said clutches. The important control feature which has been long desired is to have a torque control over the power shifted clutches, such that the system will automatically provide for engagement of the clutch to change ratio, limiting the torque through the clutch to prevent jerky operation of the vehicle and also prevent skidding the wheels of the vehicle and creating an inefficient system, and likewise prevent having such a long delay in the shift that the clutch is damaged. It is further desirable that an input be made into the electronic control or other control whereby maximum torque to be developed is set to match the control function to the general conditions under which the vehicle is operating. Obviously, for example, a high torque level is not to be maintained during a shift in an off road or other type vehicle when extremely slippery conditions are present since continuous spinning of the wheels would result.

SUMMARY OF THE INVENTION

The present invention provides a practical solution to the above expressed needs in a power shifted transmission. The present invention uses an electronic control over a hydraulic supply valve to provide a variable clutch capacity depending upon an electrical signal. The electronic controller analyzes the torque within a shaft, either an input shaft or an output shaft in the transmission, and utilizes this measurement as compared to a maximum torque level set by a computer or an operator to control the hydraulic clutch during change of ratio, such that the desired torque level computed by the computer will be maintained during the ratio change. Thus the present transmission provides for as rapid a shift as possible without exceeding predetermined operating parameters such as acceleration rate so that maximum efficiency of the ratio change is obtained, while at the same time the system can be easily conditioned for operation under varying surface characteristics.

BRIEF DESCRIPTION OF THE DRAWINGS

FIG. 4 is a schematic of a control system to provide computation for the control of the transmission of FIG. 1; and FIG. 5 is shows a modified form of electronic control to be used in the FIG. 1 transmission providing a constant time input.

DETAILED DESCRIPTION OF THE PREFERRED EMBODIMENT

Figure 1:
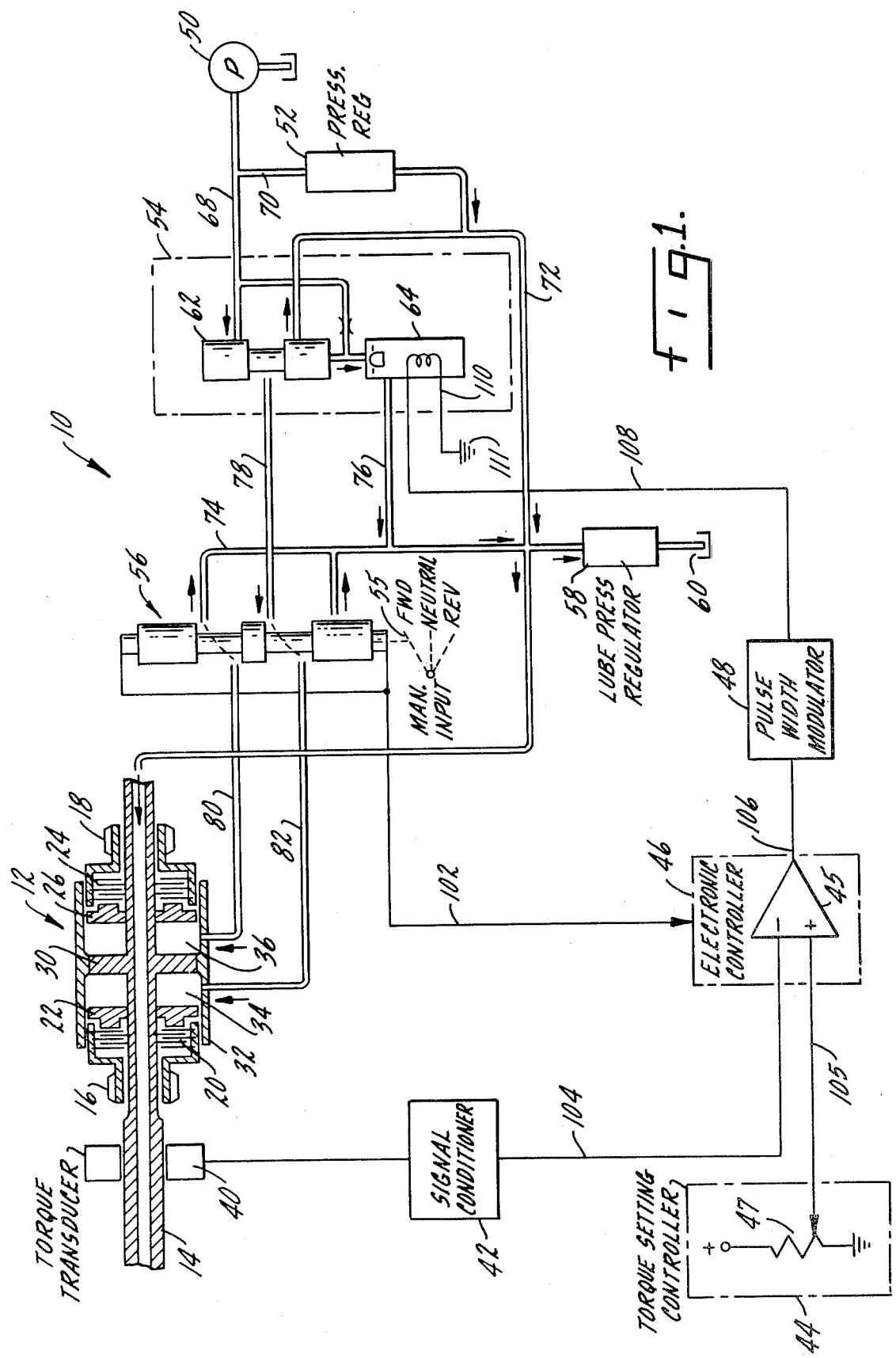
FIG. 1 shows a control system in schematic form for a power shifted transmission.

Referring to FIG. 1, a schematic representation is provided of a control system to control change of ratio in a power shifted transmission, wherein a clutch is provided for each gear ratio to be established. In FIG. 1 a control mechanism 10 is illustrated for controlling a clutch and gear unit 12 which has an input shaft 14 for receiving driving torque and a pair of gears 16 and 18 for providing a drive to gears engaged therewith to provide gear trains of different ratio. The gear 16 has a friction disc clutch pack 20, which is engaged by piston 22 and gear 18 has a friction clutch pack 24, engaged by a piston 26.

A fixed barrier 30 is provided on shaft 14, which together with an outer sleeve 32 defines a hydraulic chamber 34 for a clutch pack 20 and a hydraulic chamber 36 for clutch pack 24. Thus, as will be apparent, when fluid pressure is received in chamber 34, piston 22 will be moved to the left as viewed in the drawing to frictionally engage clutch 20 to connect gear 16 with input shaft 14 to establish a forward gear ratio, for example. When fluid pressure is received in chamber 36 the piston 26 will be moved to the right to engage clutch 24 to connect gear 18 to shaft 14 to establish reverse ratio, for example.

The pistons 22 and 26 are tied together by sleeve 32 so that as one piston is moved to engage the clutch, the other piston is moved from engagement. A transmission having clutch and gear units of this type has been previously disclosed in U.S. Pat. No. 2,920,732, for example, of common assignee.

Clutch and gear unit 12 is shown in schematic form since the control mechanism 10 is suitable for use in many gear trains, and it is not the intention to limit the present invention to a specific type of clutch and gear unit.

The control system of FIG. 1, involves a hydraulic system in combination with an electronic control system, thus the system can be characterized as electro-hydraulic. The electronic part of the control system may include, for example, a torque transducer 40, a signal conditioner 42, a torque setting controller 44, an electronic controller 46, and a pulse width modulator 48. The construction and operation of transducer 40 is completely described in application Ser. No. 747,577 filed Dec. 6, 1976 of common assignee, now U.S. Pat. No. 4,100,794, issued July 18, 1978, and the disclosure of that patent is incorporated herein by reference. Controller 44 includes a potentiometer 47. The hydraulic control system for clutch and gear pack 12 includes a pump 50, a pressure regulator valve 52, a control valve assembly 54, a manual valve 56, a lube pressure regulator 58, and a sump 60.

Control valve assembly 54 includes a hydraulic control valve 62 and a solenoid valve 64. Pump 50 is connected to control valve 54 by a conduit 68 and to the supply pressure regulator 52 by a conduit 70. A fluid return conduit 72 is connected to control valve 62 and to pressure regulator 52. Conduit 72 is the lube pressure conduit for the clutch and gear unit 12, and is also connected to lube pressure regulator 58. A fluid return line 74 is connected to valve 56 at two locations and is also connected to lube pressure conduit 72 and the lube pressure regulator 58. A return pressure conduit 76 for solenoid valve 64 is also connected to return conduit 74. A control pressure conduit 78 is connected between control valve 62 and valve 56. Valve 56 is connected to chamber 36 by conduit 80 and to chamber 34 by conduit 82.

The operation of the control system as schematically represented in FIG. 1 is as follows; if for example the vehicle has been operating with gear 16 clutched to shaft 14, to establish a forward ratio, due to pressure being supplied from control pressure conduit 78 through conduit 82 to chamber 34 and it is desired to shift the vehicle to drive in the reverse direction by engagement of clutch 24 and release of clutch 20, the operator will move the manual valve from its forward position to its reverse position. When the valve is moved to its reverse position, a fluid circuit will be completed between control pressure conduit 78 and conduit 80 to supply pressure to chamber 36 and engage clutch 24. As discussed above the movement of the piston 26 also will move piston 22 in the release direction. The position of shuttle valve 56 at this time will also connect conduit 82 to return conduit 74 to exhaust pressure from chamber 34. When the manual valve is fully moved to its reverse position switch 55 will be engaged by the end of the spool of the manual valve and will send a signal by a conductor 102 to condition the electronic controller 46 to control the engagement of clutch 24. The torque transducer 40 provides a signal, through the signal conditioner 42, which is directly proportional to the torque transmitted by shaft 14. This signal supplied over a conductor 104 is applied to an algebraic summer or comparator 45 within electronic controller 46 and is compared to a previously established maximum torque value which is set by the torque set point controller 44, connected by conductor 105 to summer 45, which with the type circuit illustrated may be manually set by the operator depending upon conditions of the vehicle. Thus, the input torque in shaft 14 is compared to a predetermined maximum torque as set by the operator in controller 44 at summer 45, and an error signal is produced on a conductor 106. This error signal is supplied to pulse width modulator mechanism 48 which will through conductor 108, control solenoid valve 64 to provide a change in control pressure in conduit 78. Solenoid valve 64 is connected by conductor 110 to ground at 111.

The valve 54 illustrated in FIG. 1 is completely described and disclosed in copending U.S. application, Ser. No. 754,382 filed Dec. 27, 1976 of common assignee, now U.S. Pat. No. 4,116,321, issued Sept. 26, 1978, which is incorporated herein by reference. The pulse width modulator mechanism 48 is completely described in application, Ser. No. 661,896 filed Feb. 27, 1976 of common assignee and now U.S. Pat. No. 4,031,782 incorporated herein by reference and a detailed description of a pulse width modulator is not given herein. It is sufficient to say that in response to the error signal on conduit 106, the pulse width modulator will control the solenoid in a manner to have the control pressure respond to the error signal and its value such that the torque established in the shaft 14 by engagement of clutch 24 does not exceed a value as set by the operator in the torque set point controller 44.

Thus, the torque point controller 44 can be set to a position which will provide maximum torque through the clutch and shaft 14 without undue acceleration rates which could affect the operator. In addition the torque level can be controlled to prevent spinning the wheels. It is contemplated that the torque limit controller 44 will be preset for the average duty cycle of a vehicle and will not be readily accessible to the operator of the vehicle to prevent the problem of the operator setting the controller 44 to a position which could be dangerous due to high acceleration rates.

Figure 2:
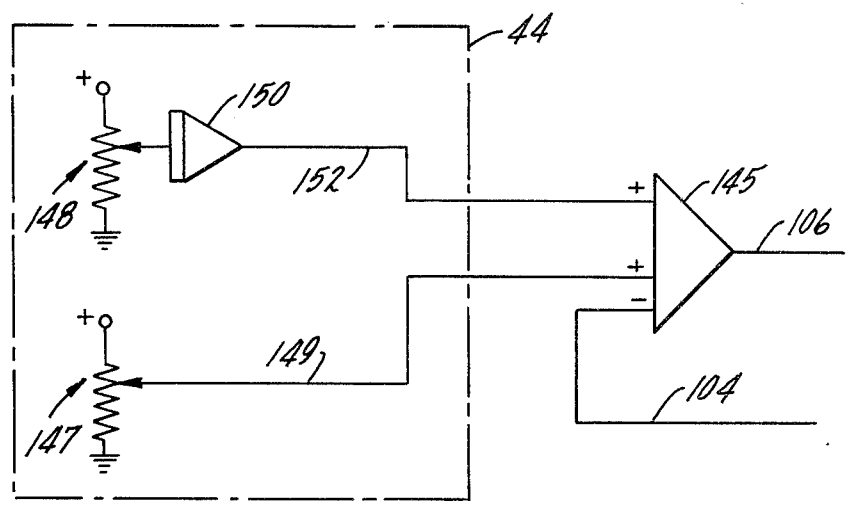
FIG. 2 shows an optional control device for the control of FIG. 1.

Referring to FIG. 2, another form of control system is illustrated wherein the signal developed by controller 44 may be calculated to provide a ramp in the torque curve as well as a step in the torque curve during a ratio change.

The construction of controller 44 as shown in FIG. 2 includes a potentiometer 147 connected to a summer 145 by a conductor 149. An additional potentiometer 148 is provided connected to an active or ramp slope stage 150 which is connected to the comparator by conductor 152.

Figure 3:
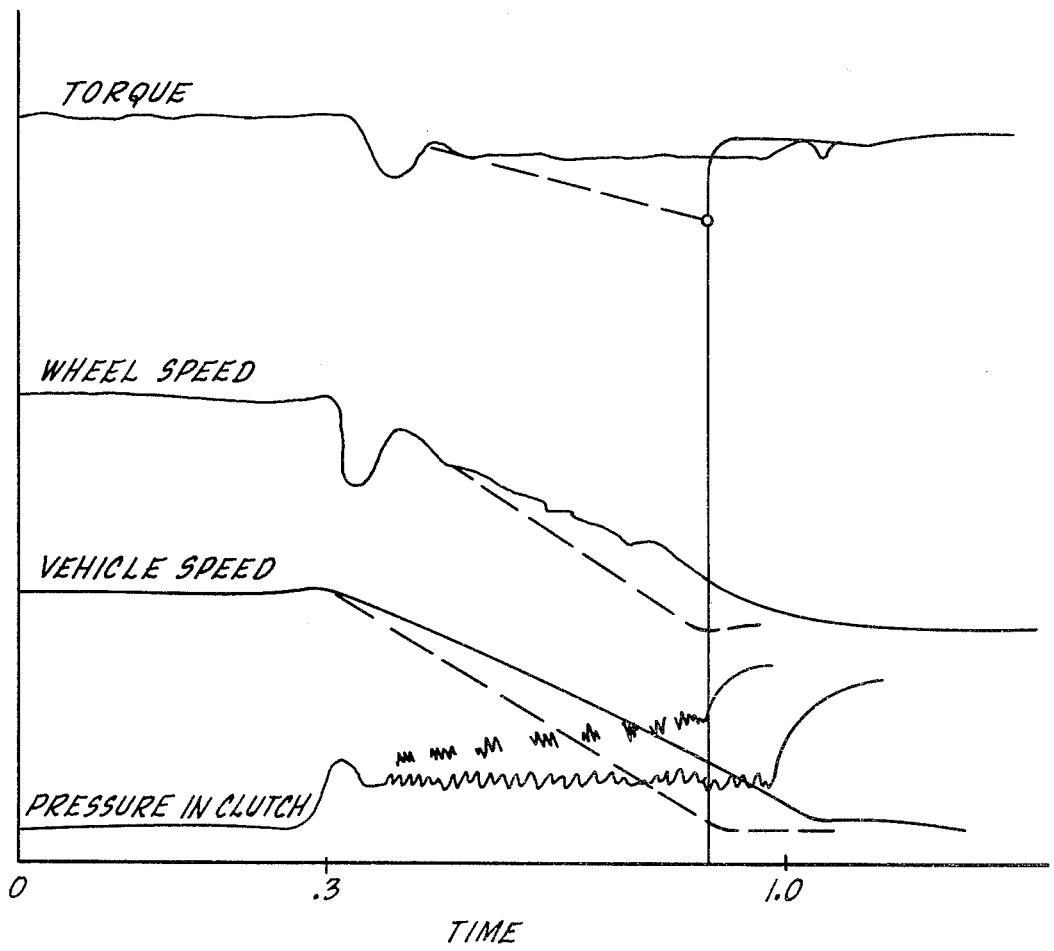
FIG. 3 is a graphical representation of various measured values through the transmission during operation of the transmission control.

Referring to FIG. 3, the solid lines on the graph represent the step type of command which gives a constant value per unit of time, type of torque control, and the addition of the ramp control in the dotted lines gives a changing value per unit of time type of torque control. For example, the pressure curve for the clutch is illustrated using a step and a ramp torque control which influences the clutch and results in a gradual increase in pressure per unit of time. As can be seen in FIG. 3 by use of a ramp signal, the torque buildup to engagement point of the clutch is much quicker, and thus the shift is more efficiently carried out. Both FIG. 1 style of control and the FIG. 2 modification include a closed loop torque control.

Thus the operation of controller 44 of FIG. 2 is that, due to the use of ramp slope stage 150, one of the inputs to summer 145 is increasing with time to provide a ramp or pressure buildup in the clutch at an increasing rate to provide as quick as shift as possible with a proper feel to the operator. Both the potentiometers 147 and 148, would be setable or adjustable by the operator. The torque level can be selected to initiate the shift by the "step" adjustment of potentiometer 147 and in addition, the ramp or rate of increasing torque buildup is adjusted by the setting of potentiometer 148 to vary the operation of stage 150.

The remaining elements in FIG. 1, would be identical to that control circuit contemplated for use with the FIG. 2 structure. Thus, the error signal supplied to conductor 106 from summer 145 will be a signal reflecting the torque levels at which the operator has selected the shift be initiated, the rate of torque increase the operator has selected and the actual torque in shaft 14 as supplied by conductor 104.

For all control schemes illustrated and described herein, the switch 55 which is actuated when valve 56 is moved to forward or reverse position will provide a signal over conduit 102 which will not only condition the controller 46 to control the shift but will make an input to the controller which will indicate whether a forward to reverse or reverse to forward shift is being made. The direction of shift is important since an operator of a vehicle, for example can take higher acceleration rates on a reverse to forward shift than he can on a forward to reverse shift. Thus controller 46 will include appropriate gain controls to increase the response for acceleration rate or torque limit to higher levels on a reverse to forward shift, for example.

In FIG. 4, a further form of control is shown in that a computer 44A is utilized to provide a signal to the electronic controller 46. The computer will receive various signals before a shift, such as the weight of the vehicle and the gear ratio established, and can from this data set a torque level which will reflect an acceleration rate which may for example, be a constant acceleration rate. The acceleration rate is represented by $\ddot{X}$ in the following formula:

$$T_o = (W_v r_w / g R_g) \ddot{X} \text{ wherein}$$

equals the torque output
$W_v$ equals the weight of the vehicle
g is a constant representing the force of gravity
Rg is a constant representing gear ratio
$r_w$ is the wheel radius of the vehicle The above formula will be valid for vehicle conditions other than wheel lockup.

Referring to FIG. 4 a computer stage 44A is illustrated which is designed to provide a constant acceleration function in connection with the circuit of FIG. 1, and would replace unit 44 of FIG. 1. The general function of the computer 44A is to provide a signal representing a computed torque level which will provide a constant acceleration. Computer stage 44A includes a transducer 200 connected to a part of the vehicle such as the springs and will produce an electrical signal related to the weight of the vehicle. A conductor 202 connects transducer 200 to a signal conditioner or amplifier 204. The amplifier 204 is connected by conductor 218 to a further amplifier stage 206. The amplifier stage 206 includes an input resistor 208 and an active output component or amplifying element 210. Connected between input resistor 208 and amplifying element 210 is a conductor 226. A conductor 228 is provided connected to a conductor 246 which is the output conductor from amplifier stage 206.

Three feedback circuits 212, 214, and 216 are provided connected between conductors 226 and 228. Feedback circuit 212 includes a switch 222 and a resistor 224. Feedback circuit 214 includes a switch 230 and a resistor 232. Feedback circuit 216 includes a switch 240 and a resistor 242. Each of the circuits 212, 214 and 216 represent logic circuits which will be activated when a certain gear ratio is established, in the transmission as for example, when first ratio is established, the signal will be supplied to switch 222 to turn on circuit 212 and thus the feedback resistor 224 is connected in parallel with the amplifying element 210 to control amplifying element 210. Thus the function of amplifier 206 is to provide a signal on conductor 246 which is representative of the gear ratio established as well as the weight of the vehicle at the particular time, thus providing two values for the equation given above.

The signal on conductor 246 is supplied to a passive stage 250 which will produce a multiplication of the signal. Passive stage 250 is connected by a conductor 254 to a multiplier 252.

Multiplier 252 is adapted to provide a signal to a conductor 268 which will include an input characteristic representative of the acceleration level desired. To provide the acceleration signal there is provided a potentiometer 260 the setting of which will be preselected for the average duty cycle of the vehicle for a particular acceleration rate. Potentiometer 260 is connected by conductor 262 to a limiter stage 264. Limiter stage 264 is connected by a conductor 266 to multiplier 252. The function of limiter 264 is to be sure that an acceleration level is set which is acceptable, in that too low an acceleration level could represent a long time period for the shift which could damage the friction element which is to be activated. Likewise, with too great an acceleration rate the vehicle could be jerked to an unacceptable degree. Conductor 266 supplies the signal to multiplier 252 and the multiplier 252 will thus supply a signal on conductor 268 which is representative of the weight of the vehicle, the gear ratio, and the desired acceleration rate. This combined signal is supplied to conductor 268 through a memory stage 270 from whence it can pass to the output conductor 105a which is connected to the controller 46 of FIG. 1 to control the ratio change in accordance therewith.

Memory stage 270 is utilized to store the value of the computed signal just described just prior to the shift so that the signal on conductor 105a will represent an initial level representative of these values. When the operator selects the forward or reverse at valve 56, a signal will be produced on conductor 272 connected to memory stage 270 to activate the memory and store the value at that time and from that time forward the signal on 105a will vary in accordance with the factors described above. Namely, the acceleration rate selected by the operator, the weight of the vehicle, the gear ratio established. It should be noted that the passive stage 250 is selected and designed to reflect a constant related to the wheel radius for that particular vehicle and the constant (g) representing gravity.

Thus, computer 44A of FIG. 4 will provide a control for the ratio change over conduit 105a and through controller 46 which will provide a constant acceleration rate for the vehicle during a shift and should provide the quickest shift which can be accomplished within acceptable acceleration limits. Similar to the design in FIG. 1, the acceleration rate will be preselected by setting of potentiometer 260 and this control will not be accessible by the operator to prevent the operator from setting dangerous acceleration levels.

Thus the circuit as controlled by 44A is an open loop acceleration control circuit in that the ratio change will be controlled by torque feedback as described for FIG. 1 above and computed acceleration rate, however, there is no actual acceleration measurement and feedback. The computer 44A merely computes an acceleration rate to control the shift but provides no means for sensing the acceleration rate actually established in the vehicle at a particular time.

Referring to FIG. 5 there is illustrated a computer stage 44T to be used to replace controller stage 44 of FIG. 1, to provide a control for the vehicle during ratio changing which will reflect a preselected constant time function. The general function of the circuit of FIG. 5, is to allow the operator to accomplish shifts by setting a particular time duration for the shift within which the shift will be completed, and the circuit computes an acceleration rate which will accomplish the shift within the time parameters desired.

The same elements as used and described with regard to FIG. 4 are shown in FIG. 5 within the box 44A and carry like component numbers. The function of the circuit of 44A is exactly the same as described with respect to FIG. 4 with the exception that the setting of the acceleration rate is carried out by an additional computing stage 44t which provides an input signal reflective of constant time selected on a conduit 262 to the limiter stage 264.

Computer stage 44t includes a potentiometer 300 connected by a conductor 302 to a limiter stage 304. Limiter stage 304 is connected by conductor 306 to a multiplier stage 308, which has as its output, conductor 262. Computer 44t includes a wheel speed transducer 310, which may be of a known type in the prior art which can sense wheel speed and provide an electrical signal representative thereof. Transducer 310 is connected by a conductor 312 to a signal conditioner or multiplier 314 which is in turn connected by a conductor 316 to a memory stage 318. The memory stage 318 is connected by a conductor 320 to the multiplier 308.

Thus multiplier 308 will receive a signal over conductor 306 which is reflective of the time selected for the shift and conductor 320 will have a signal thereon representative of wheel speed. These values will be processed by the multiplier 308 to provide a signal varying with each of the values over conductor 262. As will be apparent, if a relatively long time for the shift is selected, a small signal will be provided on conductor 306 to provide an output signal on conductor 262 representative of a lower acceleration rate thus insuring a longer shift time. The function of the limiter stage 304 is to insure that the time selected by the operator is within acceptable limits for the vehicle. Referring to the memory stage 318 when the operator selects a ratio change, a signal will be received over a conductor 322 to activate memory stage 318 and store the wheel speed at the beginning of the shift.

Since the acceleration rate which must be computed to produce a constant time is related to change of velocity per unit of change in time, the computer stage 44t has a signal selected representing time which may be varied for different vehicle conditions and has a signal over conductor 320 representative of velocity of wheel speed of the vehicle. Thus, the acceleration rate set by the computer stage 44t of computer stage 44T will represent a constant shift time value.

As described above, torque transducer 40 is connected to shaft 14 which is described as an input shaft. Obviously, if gears 16 and 18 are driven by other gears, shaft 14 can be an output shaft. The control system described above can be utilized with the torque sensor either on the input or output shaft. Although output shaft torque is thought to be most representative of the actual condition of the vehicle at a given time, input shaft torque in most installations and environments is proportional to output shaft torque such that input shaft torque is usable as a shift control signal. It has been found however, with many off road type vehicles access to an engine or input shaft and mounting of a torque transducer is much simpler than with the output shaft, and for this reason a practical electronic control system working with input shaft torque is desirable. The electronic package and circuitry is simplified by using the input shaft since the torque direction is always the same whereas if the output shaft torque from the transmission is used, the direction of torque is changing.

Various of the features of the invention have been particularly shown and described, however, it should be obvious to one skilled in the art that modifications may be made therein without departing from the scope of the invention.

I claim:

1. A control system for controlling an element engageable to establish a gear ratio in a gear set, a torque transmitting shaft in said gear set, a torque sensor associated with said shaft and adapted to provide a signal responsive to torque transmitted by said shaft, acceleration signal means producing a signal responsive to a desired acceleration rate, an electronic controller connected to said acceleration signal means and said torque sensor, said electronic controller including an amplifier stage having logic means responsive to the gear ratio established to provide a signal representative of the gear ratio established, transducer means responsive to vehicle weight and connected to provide a signal thereto representative of vehicle weight to said controller, a control mechanism for controlling engagement of said engageable element, means connecting said controller and control mechanism whereby establishment of said ratio is controlled by said controller in accordance with the torque value in said shaft and said desired acceleration rate, whereby said acceleration rate will not exceed the limit established by said acceleration signal means, wherein said controller includes a comparator connected to said acceleration signal means and said torque sensor, a pulse width modulating means connected to said comparator and said hydraulic valve, whereby said comparator supplies a signal to said pulse width modulating means which varies with torque of said shaft and said acceleration signal.

2. A control system for controlling an engageable element engageable to establish a gear ratio in a gear set, a torque transmitting shaft in said gear set, a torque sensor associated with said shaft and adapted to provide a signal responsive to torque transmitted by said shaft, acceleration signal means producing a signal responsive to a desired acceleration rate, an electronic controller connected to said acceleration signal means and said torque sensor, a control mechanism for controlling engagement of said engageable element, and means connecting said controller and control mechanism whereby establishment of said ratio is controlled by said controller not only in accordance with the torque value in said shaft but also in accordance with said desired acceleration rate, whereby said acceleration rate will not exceed the limit established by said acceleration signal means.

3. A control system as in claim 2 wherein the setting of acceleration signal means is adjustable.

4. A control system as in claim 2 wherein said electronic controller includes an amplifier stage having logic means responsive to the gear ratio established to provide a signal representative of the gear ratio established.

5. A control system as claimed in claim 4 wherein transducer means responsive to vehicle weight is connected to said controller to provide a signal thereto representative of vehicle weight.

6. A control system for controlling change of gear ratio in a gear set having an engageable element engageable to establish a gear ratio in said gear set, a torque transmitting shaft in said gear set, a torque sensor associated with said shaft and adapted to provide a signal responsive to torque transmitted by said shaft, adjustable torque limit means, an electronic controller connected to said torque limit means and said torque sensor, a control mechanism for controlling engagement of said engageable element, and means connecting said controller and control mechanism whereby establishment of said ratio is controlled by said controller not only in accordance with the torque value in said shaft but also in accordance with the setting of said adjustable torque limit means so that said torque will not exceed the limit established by said limit means.

7. A control system as in claim 6 wherein said torque limit means is manually adjustable.

8. A control system as in claim 6 wherein said shaft is an input shaft to the gear set.

9. A control system as in claim 6 wherein said engageable element is engageable by fluid pressure, said control mechanism includes a hydrualic valve connected to a source of fluid pressure, and said controller controls said hydraulic valve.

10. A control system as claimed in claim 9 wherein said controller includes a comparator connected to said torque limit means and said torque sensor, a pulse width modulating means connected to said comparator and said hydraulic valve, whereby said comparator supplies a signal to said pulse width modulating means which varies with torque of said shaft and said torque limit means.

11. A control system for controlling an engageable element to establish a gear ratio in a gear set, a torque transmitting shaft in said gear set, a torque sensor associated with said shaft and adapted to provide a signal responsive to torque transmitted by said shaft, time limit means, an electronic controller connected to said time limit means and said torque sensor, a control mechanism for controlling engagement of said engageable element, means connecting said controller and control mechanism whereby establishment of said ratio is controlled by said controller in accordance with the torque value in said shaft and whereby the time to establish said ratio will not exceed the limit established.

12. A control system as in claim 11 wherein said shaft is an input shaft to the gear set.

13. A control system as in claim 11 wherein said engageable element is engageable by fluid pressure, said control mechanism includes a hydraulic valve connected to a source of fluid pressure, and said controller controls said hydraulic valve.

14. A control system as claimed in claim 13 wherein said controller includes a comparator connected to said time limit means and said torque sensor, a pulse width modulating means connected to said comparator and said hydraulic valve, whereby said comparator supplies a signal to said pulse width modulating means which varies with torque of said shaft and said time limit means.

15. A control system as in claim 11 wherein said time limit means includes means to sense vehicle wheel speed, memory means to store the wheel speed signal, and a variable element to select a signal representative of the time desired for the ratio change.

* * * * *